Dec. 5, 1967 S. J. MacARTHUR 3,357,003

SINGLE CHANNEL QUATERNARY MAGNETIC RECORDING SYSTEM

Filed Dec. 28, 1964 4 Sheets-Sheet 1

INVENTOR.
STEVEN J. MACARTHUR

BY Fraser and Bogucki

ATTORNEYS

INVENTOR.
STEVEN J. MACARTHUR
BY Fraser and Bogucki
ATTORNEYS

INVENTOR.
STEVEN J. MACARTHUR

BY Fraser and Bogucki

ATTORNEYS

INVENTOR.
STEVEN J. MACARTHUR

BY Fraser and Bogucki

ATTORNEYS

3,357,003
SINGLE CHANNEL QUATERNARY MAGNETIC RECORDING SYSTEM

Steven J. MacArthur, San Jose, Calif., assignor to International Business Machines Corporation, Armonk, N.Y., a corporation of New York Filed Dec. 28, 1964, Ser. No. 421,177
24 Claims. (Cl. 340—174.1)

This invention relates to digital information storage systems and relates particularly to magnetic storage systems which enable data storage at higher rates and densities than heretofore.

Information storage based on the use of magnetic disks, drums, tapes and the like is now widely employed in digital computers and other modern information handling systems. In such systems, minute incremental areas of a storage medium are magnetized in either of the two opposite polarities to denote digital data. Relative movement between the storage medium and a transducer induces current variations that reproduce the data.

It is generally desirable to record bits of data as densely as possible on a storage medium in order to provide maximum storage capacity. Maximum density is generally limited by the characteristics of the transducer and the magnetic medium, and by the dynamic stability of the storage mechanism at a given speed. The reproduced signal is subject to noise, circuit drift, and circuit inductance, so that sharply defined recorded patterns can readily be lost during reproduction.

Accordingly, for a given length of recording medium, only a limited number of clearly discernible states of magnetization can be established. Maximum storage density is obtained by using the states of magnetization to reproduce data in optimum fashion. Coding schemes used for storing digital information on a magnetic medium have employed transition and magnetization states in various ways to denote binary conditions. Four of the techniques most widely used are the NRZ (nonreturn to zero), NRZI (nonreturn to zero IBM), double frequency, and phase modulation systems. The majority of these techniques are based on the fact that transitions in the reproduced data signal provide more clearly identified conditions than do steady state signals.

NRZ recording utilizes a transition from one magnetic polarity to the opposite polarity every time there is a change in the binary coded information from "1" to "0" or from "0" to "1." This method utilizes only one parameter, the fact of transition regardless of direction of transition (in addition to the previous state) to yield data.

NRZI recording employs a transition at every "1" with a lack of transition implying "0." This scheme also utilizes only one parameter to yield data: the fact of transition regardless of direction.

The double frequency recording technique is similar to an NRZI signal modulated by a clock. This method utilizes a clock to establish regular intervals, and employs a transition during the interval to indicate a "1" and a lack of transition during the interval to indicate a "0." This technique, like the NRZ and NRZI methods, utilizes only one parameter, the fact of transition regardless of direction, to yield data. The use of a clock to enable transitions to occur only during an interval results in greater reliability, but does not add to the density of information stored. It may be noted that twice as many transitions are required in the double frequency scheme to indicate a "1" as in the first two schemes.

The phase modulation system employs a transition for each bit of data, a "1" or "0" being determined by the direction of the transition. Successive "1's" or "0's" require an extra transition between each bit, which results in double the data bit recording frequency. The phase modulation scheme utilizes the direction of transition as well as the fact of transition to indicate data.

The foregoing four digital magnetic recording techniques have similar data storage density capabilities when used with the same recording equipment. Phase modulation techniques permit greater density with magnetic tape systems, in which dynamic skew can be a limiting factor, because each binary digit position in a multichannel record is effectively self-clocked. The primary advantage of double frequency and phase modulation is not greater density, however, but increased reliability.

Any improvement in bit density which can be achieved simply by modification of the recorded signal is of course desirable, because of the proportional increases in system speed and capacity that result. Further, however, it is also extremely desirable to be able to achieve greater system versatility, as by using serial single channel recording for alphanumeric characters, or by encoding different data concurrently on a single channel.

Accordingly, one object of the present invention is to provide a data recording system and method which enables the recording of data at higher densities than heretofore.

Another object is to provide a data recording system and method for enabling more efficient recording of data on a magnetic medium.

Yet another object is to provide more versatile magnetic recording systems for digital data than have heretofore been available.

Still another object is to provide a data storage system for enabling the simultaneous storage of two binary data trains.

A still further object is to provide data storage techniques for recording data in data cells wherein each cell is magnetized to represent more than binary information.

Another object of the present invention is to provide improved methods for recording and reproducing digital data.

The foregoing and other objects of the invention are realized in data recording and reproduction systems and methods that represent data by using both the two polarities of a saturable recording medium and also the two transition directions between the opposite states of saturation magnetization. Thus, instead of merely binary states, there are available four different states for the recordation and reproduction of data.

In accordance with one system and method in accordance with the invention, two binary signal trains may be recorded simultaneously, and at high density. Binary digits are taken from each of two serial binary signal trains, and used to establish one of four possible data states in a quaternary coding format. Concurrently, data intervals are defined by clock signals, and selected one of the quaternary-valued states of the data signal are established at data times, to represent each of the two binary digits from the separate signal trains. In accordance with one aspect of the invention, the clock signal may be introduced into the recorded signal itself, at a selected point intermediate successive data times. In a preferred arrangement in accordance with the invention, the clock signal is provided as a signal transition occurring at a specific point within every data interval, and an additional preparatory transition may be used selectively. The preparatory transition is introduced as determined by the relationship between the signal state at the end of the clock time and the desired signal condition during the succeeding data time. In this system for recording, control circuits responsive to binary values next to be recorded, as well as those being recorded, generate signal waveforms containing the appropriate clock and preparatory transitions, as well as the chosen signal states at data times. In systems for the reproduction of data, the data interval is redefined, and the signal state at the data time is established, so that a quaternary digit or two separate binary digits may be identified. The data interval is preferably identified through use of the clock transition, with logic circuits being used to provide signal indications of the selected digital values.

In other systems in accordance with the invention, quaternary recording may be used to advantage to represent alphanumeric data in only two or three successive data intervals or cells. In such systems, each character may be recorded as a limited series of quaternary digits.

Record circuits in accordance with the invention use bistable and logical gating elements to generate a signal train of controlled characteristics, such as to provide the predetermined recorded signal conditions at data times. Reproducing circuits in accordance with the invention are self-locking and derive the encoded data in quaternary or binary form. Particular advantages of simplicity and economy are achieved, in accordance with the invention, through use of specified gating circuits and binary input signal trains to generate the quaternary signal trains for recording. On reproduction of the recorded signal, considerable simplification is achieved by the use of time delays in the decoding logic.

The foregoing and other objects, features and advantages of the invention will be apparent from the following more particular description of preferred embodiments of the invention, as illustrated in the accompanying drawings.

Figure 1:
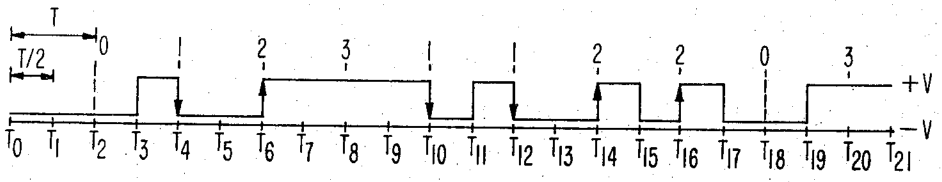
FIG. 1 is a simplified graphical representation of recorded waveforms employed in a simplified example of systems and methods in accordance with the invention.

Reference is now directed to FIG. 1, which illustrates the manner in which data may be recorded on a magnetic medium in systems and methods according to the invention. The magnetic medium will normally be a recording surface on a tape, disk, drum, card or other commonly used member. At all times, except at the rising and falling edges that denote the very short transition times, the recorded pattern is at saturation magnetization in either the positive polarity (designated +V) or the negative polarity (designated −V). Saturization magnetization need not be used, as long as a steady state level is employed, but is preferable for most purposes. Data intervals (T) are defined relative to the clock times, shown on the time base as points $t_0$, $t_1$, $t_2$ . . . $t_{20}$. A data interval or cell has a duration (T) twice the clock interval. The recorded pattern thus changes only at the clock times, with data times occurring only at every other clock time. In the example shown in FIG. 1, the data times are the alternate even times $t_0$, $t_2$, $t_4$ and so forth. Data is represented at these data times either by maintenance of a steady state saturation magnetization condition, of either polarity, or by a positive-going or negative-going transition from one saturation condition to the other. Thus, one of four possible states uniquely exists at the data times, as determined by the recorded signal pattern. It will be noted that the graphic representation of FIG. 1 corresponds to both the recording signal and the recorded signal pattern on the magnetic medium, but that the reproduced signal represents the rate of change of flux, or typical derivative function, and therefore differs substantially in form although the same data is represented by the reproduced signal.

In FIG. 1, therefore, it will be observed that the quaternary data states 0, 1, 2 and 3 are each represented by a unique signal condition at the data time. The "0" and "3" values are represented by steady state levels −V and +V respectively. The "1" and "2" values are denoted by negative-going and positive-going transitions respectively.

It will be noted in the arrangement of FIG. 1 that transitions in the signal sequence are introduced only at clock times. Therefore, a conventional oscillator circuit having a flywheel effect and adequate short-term stability for the data sequences being handled may be employed, and maintained in synchronism by the signal transitions in the recorded signal itself on reproduction of the signal. In this example, the transitions at the odd-valued clock times do not represent data, but constitute the preparatory transitions which enable the proper signal condition to be presented at the succeeding data time. Note that these preparatory transitions are introduced directly as a result of the relationship of two successive quaternary digital values, so that systems and methods in accordance with the invention provide a recorded signal waveform which depends both upon the relationship of a pair of successive digital values and the values themselves. On reproduction, only the quaternary data values are employed, either in the form of a signal train which represents a pair of concurrent binary signal trains, or as an alphanumeric coding system, or in some other manner.

Figure 2:
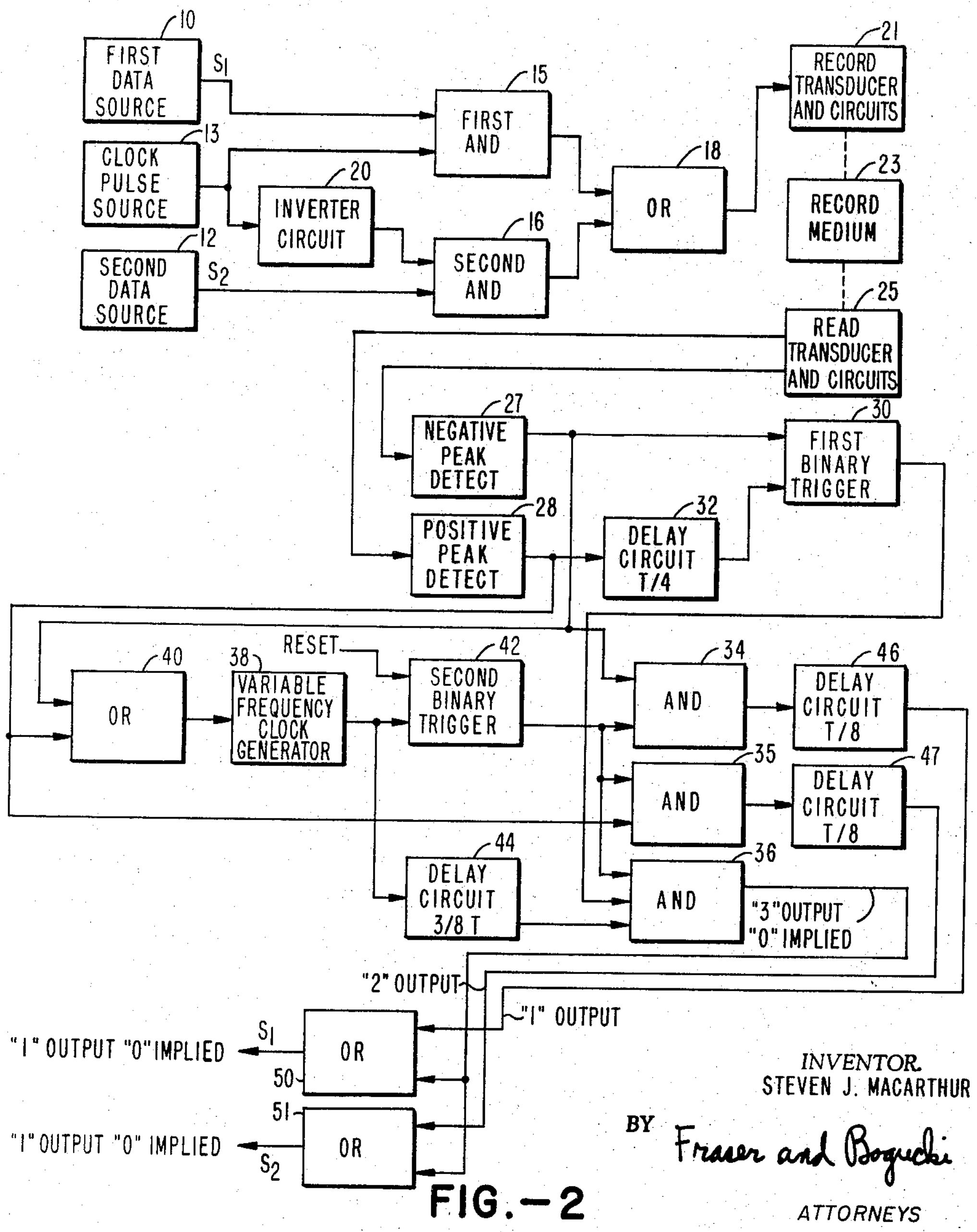
FIG. 2 is a block diagram of a first form of recording and reproducing system in accordance with the invention.
Figure 3:
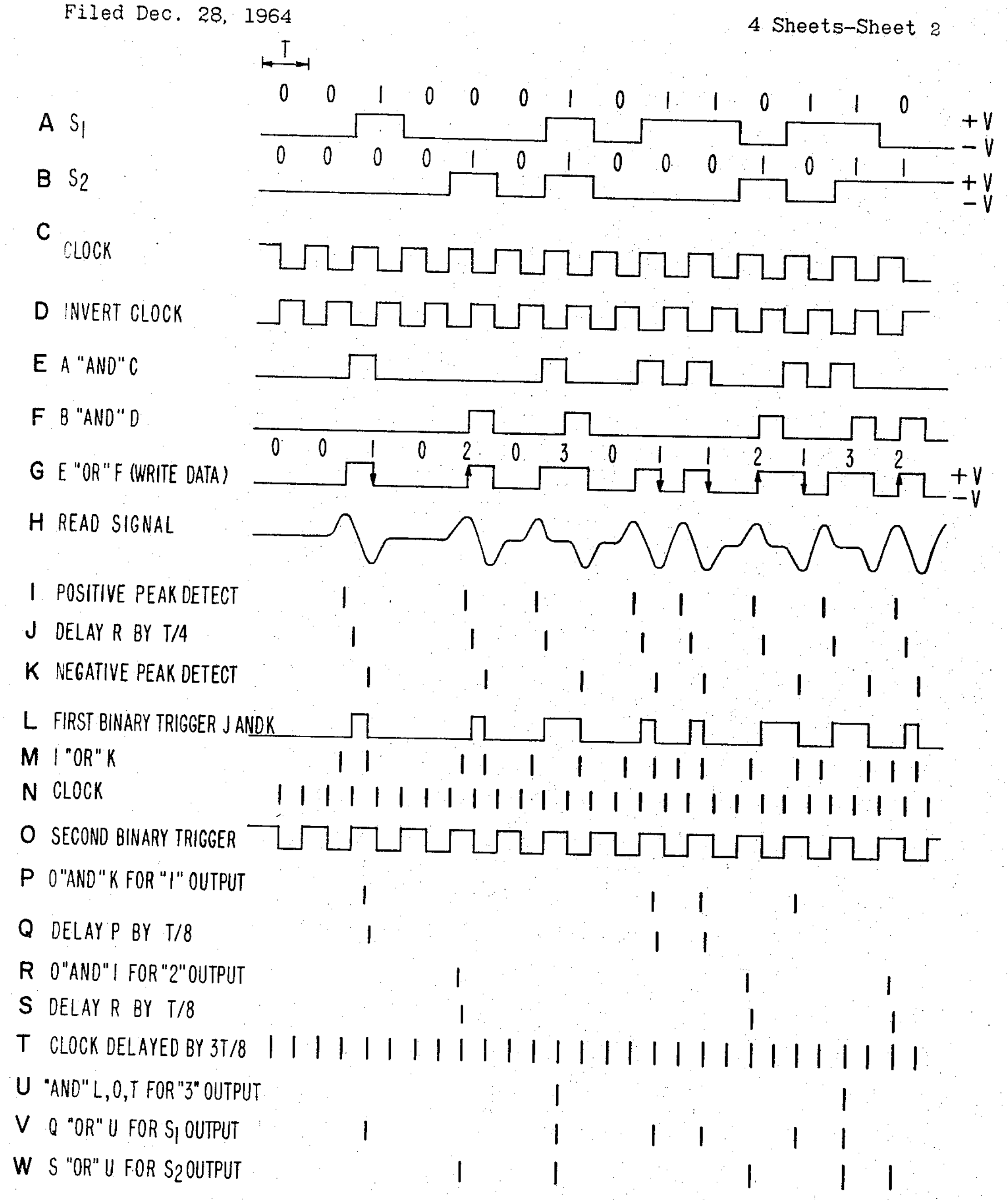
FIG. 3 is a graphical representation of waveforms plotted to a common time scale and useful to the appreciation of the operation of the arrangement of FIG. 2.

Recording and reproducing systems in accordance with the invention, as used in conjunction with two signal coding, are shown in FIG. 2, the waveforms representative of signals occurring at different points in the system being shown in FIG. 3. Referring specifically to FIG. 2 at first binary train, designated $S_1$, is provided from a first data source 10, and a second train of binary data $S_2$, is provided from a second data source 12. It will be appreciated that the data sources 10, 12 have been reduced to their simplest terms in order to clarify the description of the invention, although these may be representative of portions of complex but conventional systems in a typical situation. A high-density magnetic type system, for example, may employ seven such signal channels for alphanumeric data. Conventional systems, however, are incapable of recording a pair of binary serial trains concurrently in the same channel.

The data pulses provided from the sources 10, 12 are in this example accompanied by clock pulses at twice the basic data from a clock pulse source 13. Although other forms of clock systems may be employed, the present example is particularly advantageous in terms of system mechanization. The signals provided from the data sources 10, 12 are binary-valued signal levels, such as might be taken from the output terminals of a bistable multivibrator, and in the present convention the 1-valued state is indicated by a more positive voltage level, and the 0-valued state by the more negative voltage level. These signals are initiated and terminated concurrently with the leading edges of the clock pulses, as shown by a comparison of waveforms A and B (signals $S_1$ and $S_2$) in FIG. 3, with waveform C, the clock signal.

Referring again to FIG. 2, the signals from the data sources 10, 12 are selectively combined, under control of the clock, in a logical gating network comprising first and second AND gates 15, 16 which are coupled to the input terminals of an OR gate 18. The signals from the first data source 10 are applied to the first AND gate 15, along with noninverted clock pulses, whereas the signals from the second data source 12 are applied to the second AND gate 16 with clock pulses after passing through an inverter circuit 20. The output signals from the OR circuit are applied to the record circuits and transducer 21 which are in operative association with the recording medium 23, it being understood that, as is conventional, there is some relative movement between the transducer 21 and the recording medium 23.

For reproduction of the recorded signals, the recording medium 23 is passed adjacent appropriate means, such as a read transducer means 25 including signal reproducing circuits. The recording and reproducing transducers may be the same element, if desired, although the recording and reproducing circuits used are of course different. The signal transitions in the reproduced wave are identified by a pair of peak detector circuits 27, 28 which are responsive to the negative and positive polarity peaks respectively. The peak detection pulses alone are sufficient to regenerate the data signals $S_1$ and $S_2$, and to regenerate the internal clock.

The peak detectors 27, 28 generate pulses coincident with the peaks in the reproduced data signal, or transitions in the recorded data signal. The pulse from the positive peak detector 28 is applied to a first binary trigger 30 through a delay circuit 32 that provides a delay of ¼ the data interval, the first binary trigger 30 thereafter being reset by the output pulse from the negative peak detector 27. The first binary trigger 30 forms part of a logical gating means which includes a set of three AND gates 34, 35, 36 in this arrangement, these AND gates being activated in different combinations to separately identify the different digital values.

The logical gating network operates in combination with a self-clocking system that includes a variable frequency clock pulse generator 38 having a nominal frequency corresponding to twice the data rate of the reproduced signals. The variable frequency clock pulse generator 38, however, may be any frequency generator having a flywheel effect and maintaining a nominal frequency with reasonable short-term stability, but being resettable under control of an applied timing signal. Here the timing signals are derived from the pulses generated by the peak detectors 27, 28 and applied to correct the timing of the variable frequency clock 38 through an OR circuit 40. The clock pulses are applied to a second binary trigger circuit 42 in a manner to provide a square wave signal having half the clock pulse frequency. To this end, output signals may be taken from one terminal of a conventional bistable multivibrator that is changed in state for each input pulse by application of the clock pulses to a trigger input. A reset pulse may be provided by conventional means at the start of operation to insure that the trigger operates in proper phase. Alternatively, the clock pulses may be applied to set the trigger 42, with resetting being accomplished by conventional means at a time interval corresponding to $T/2$ thereafter. Such convention means is provided, for example, by a one-shot multivibrator coupled to be activated by the setting of the trigger, and having an active interval corresponding to $T/2$.

The clock signals, provided at a frequency which is twice that of the data rate, are also applied to a delay circuit 44 that provides a delay corresponding to ⅜ T.

In this arrangement, the second binary trigger 42 primes or conditions one input terminal of each of the AND gates 34, 35, 36. The negative peak pulse are applied to the AND gate 34, which when primed by the trigger 42 provides an output pulse through a delay circuit 46, the delay being equal to a time interval of $T/8$. The output pulse from this delay circuit 46 designates a digital value of "1" in the quaternary coding scheme. The next AND gate 35 is responsive to the positive peak pulses, as well as to the output of the trigger 42, and provides output pulses through a different delay circuit 47 which provides a corresponding $T/8$ delay and represents a "2" valued output in the quaternary code. The remaining AND gate 36 is fully activated when true valued signals are concurrently provided from the first binary trigger 30, the second binary trigger 42 and the delay circuit 44, and provides an output pulse which represents the quaternary "3." The logical gating network converts these three values (the "0" value being implied by the absence of all three of the other values) to two binary-valued signals by application of a pair of OR circuits 50, 51.

The manner in which two binary signal trains are concurrently recorded and reproduced by the arrangement of FIG. 2 will be better understood by reference to the waveforms of FIG. 3, as well as to the block diagram of FIG. 2. The two binary data signals $S_1$ and $S_2$ (waveforms A and B) are provided as rectangular waveforms, in a non-return to zero code. In these waveforms, a positive limiting value represents a binary 1, and a negative (or less positive) limiting value represents a binary 0. The transitions in the data occur midway in the data interval, so that in conventional fashion the data states may be clocked at the data times. The clock and inverted clock pulses are shown as waveforms C and D. The combination of waveform A with waveform C is accomplished by the first AND gate 15 (FIG. 2), so that a train of pulses (waveform E), each having an interval $T/2$ and terminating with the data times is generated as the output signal from the first AND gate 15. Because the second AND gate 16 is activated only during the intervals of the inverted clock, the output signals from this gate 16 are also of an interval $T/2$, but are initiated with the data time. These output signals retain their binary character at this point, but are converted to the quaternary cooling system discussed above in conjunction with FIG. 1, by combination in the OR gate 18, from which they are recorded in the same form of the record medium 23 through the record transducer and associated circuits 21.

This conversion will be better appreciated by reference to waveform G in FIG. 3. When combining the digital values of $S_1$ and $S_2$ at any data time, a pair of binary "0's" is taken to represent a quaternary "0." When the $S_1$ value is binary "1" and the $S_2$ value is binary "0" the quaternary combination is "1" or a negative-going transition. The "0" value in the quaternary code is a negative magnetization or negative steady state level. Conversely, the condition in which the $S_1$ binary digit is a "0" and the $S_2$ binary digit is a "1" results in a quaternary "2," or a positive-going transition. A final condition, in which both the $S_1$ and $S_2$ binary digits are "1" results in a quaternary "3," or steady state maintenance of the positive level. Thus, it may be observed that in waveform G the half-cycle time shifting of the $S_1$ and $S_2$ data signals has very simply combined these binary-representative signals into the quaternary coded signal train, with transitions or steady states at the data time representing both of the binary values.

On reproduction of the recorded magnetization pattern, the significant characteristics in the reproduced signal occur at the transition points, because the transducers are as noted above responsive to rate of change of flux and therefore provide differential signals. The characteristics of the reproduced signal are substantially affected by the characteristics of the transducer, particularly the head gap. The modern practice, for high density recording, is to approach the maximum capability of the head, so that the head gap encompasses a substantial portion of each data cell or increment along the tape, and the reproduced signal has a substantially rounded waveform, with only the signal peaks providing definite indications of the data transitions. The reproduced waveform, shown as waveform H, which corresponds to the recorded signal and pattern of waveform G in FIG. 3 is that which would be provided by a transducer having a relatively small head gap by comparison to the recording density. Thus the peaks and zero conditions are more clearly defined than is typically the case, as is discussed below in conjunction with the example of FIG. 4. It will be understood, therefore, that the waveform H of FIG. 3 is provided only for clarity of understanding.

Referring again to FIG. 2 the negative peak detector 27 and positive peak detector 28 respond to the negative and positive-going transitions in the reproduced signal, due to the presence of the peak in the differentiated reproduced signal, and provide pulse outputs which identify these transitions in time (waveforms K and I respectively in FIG. 3). The positive peak detection pulse is delayed by an interval of $T/4$ in the delay circuit 32, as shown by waveform J in FIG. 3. This delayed pulse is applied to set the first binary trigger 30, establishing a first control signal which is used in sensing for the steady state condition in which the record is at saturation magnetization in the positive direction, which as described above is used to indicate the quaternary "3" state. The presence of this positive-going transition, as indicated by the first binary trigger 30, is used to condition the first AND gate 36 in the group of AND gates 34, 35, 36. The output signal derived from the first binary trigger 30 is shown as waveform L in FIG. 3.

The variable frequency clock signal operates at twice the nominal data rate of an individual serial binary train. A clock generator 38, which is resettable in phase as previously described, is controlled so as to be reset by pulses from either the negative peak detector 27 or the positive peak detector 28 applied without intermediate delay through the OR circuit 40, as represented by waveform M in FIG. 3. Relative to the time base of the negative and positive peaks, the resetting pulses applied to the input of the clock generator 38 are used to cause a shift of 180 degrees in phase, in order to provide subsequent sampling of data at the data times. The clock waveform is designated N in FIG. 3. The second binary trigger 42 is thereafter switched with each clock pulse, to generate the waveform designated 0 in FIG. 3.

According to the convention here chosen, the AND gates 34, 35 and 36 are conditioned by the output signal (waveform 0) from the second binary trigger 42 whenever the voltage level is at a positive-going limit. It will be noted that these control signals therefore constitute sampling times which encompass the peaks in the reproduced signal (waveform H). Given the control signals from the first and second binary triggers 30, 42 respectively, and the delayed clock signal derived from the delay circuit 44, the associated decision circuits separately identify and regenerate the two concurrently existing binary signal trains.

The quaternary "0" output condition is implied, in this arrangement, from the absence of the "1," "2" and "3" values, although it may be positively detected and identified as well if desired. For purposes of illustration, however, the regenerated signal trains are provided in the form of pulses to designate binary values of "1," and with the absence of pulses designating the binary "0."

The quaternary value of "1" is identified by the AND gate 34, which is activated when a negative peak pulse is provided from the detector 27 at the sampling time. The output signal from the AND gate 34 is applied through the delay circuit 46, which introduces a delay of $T/8$, in order that the various binary signals may be provided in synchronism as described below. The introduction of delays as provided in the system of FIG. 2 substantially reduces the amount of circuitry which need be employed, particularly in the number of bistable elements, with the only difference from the reproduced data signal being a slight delay on the time base, here ⅛ of the data interval.

In like fashion, the AND gate 35 is conditioned during sampling times by the second binary trigger 42, and activated by positive peak pulses from the detector 28, with the output pulses being delayed by the $T/8$ interval in the delay circuit 47. The output pulses from the AND gate 34 prior to and subsequent to delay are shown by waveforms P and Q in FIG. 3, whereas the corresponding pulses from the AND gate 35 are shown by waveforms R and S in FIG. 3.

The output signal from the AND gate 36, which designates the "3" quaternary value, is provided upon coincidence of the first control signal from the first binary trigger 30, the second control signal from the second binary trigger 42 and the clock signal delayed by the ⅜ T interval in the delay circuit 44. As previously described, the quaternary "3" value represents the steady state positive magnetization condition in the record member, which in turn is identified by a positive-going transition without a subsequent negative-going transition. Thus, when the first binary trigger 30 is set prior to the sampling time by a positive peak pulse from the detector 28, and is not subsequently reset, the necessary conditions are satisfied. The delay circuit 32, by inserting the delay of $T/4$, insures that the steady state positive magnetization condition is distinguished from the positive-going transition at a data time.

The delay circuit 44 delays the clock pulse by ⅜ T, as shown by waveform T, and effectively controls the sampling of the "3" value, as well as bringing the output pulse from the AND gate 36 into synchronism with the output pulses from the delay circuits 46, 47. It will be noted from waveform N in FIG. 3 that the regular clock pulses occur at points $T/4$ and ¾ T relative to the regular data interval. The further delay of ⅜ T, as shown in waveform T of FIG. 3, shifts these points to the $T/8$ and ⅝ T points within the data interval. Consequently, within the square wave defined by the output signal from the second binary trigger 42, the pulse provided at $T/8$ time passes through the AND gate 36, under the proper signal conditions to provide the "3" valued signal in synchronous relation to the "1" and "2" valued signals on the parallel output lines.

The quaternary code values are subsequently converted to the corresponding binary values for the signal trains $S_1$ and $S_2$ by the OR circuits 50, 51. A "0" output value for each data signal is implicitly present when neither OR circuit 50, 51 is activated. A "1" quaternary signal provides an output signal in the $S_1$ channel only through the OR circuit 50, whereas the quaternary "2" signal provides an output signal only through the circuit 51, into the $S_2$ channel. A quaternary "3" signal provides a binary "1" valued signal in both channels.

Thus, it may be noted that an extremely simple arrangement is provided for increasing the density with which data may be recorded on a magnetic medium, or alternatively substantially increasing the versatility of a recording and reproducing system, as by providing concurrent recording and reproduction of two coded signals. Two signals may be interleaved in time, and recorded on a single channel without requiring any modification whatsoever of the recording and reproducing transducers, or of the record medium. As disclosed in FIG. 2 and hereafter, the circuitry by which the coding to a quaternary code for recording may be accomplished is relatively simple and introduces no impairment of signal reliability.

In the arrangement of FIG. 2, reliance is placed on a self-clocking system which drives a variable frequency oscillator. When extremely high densities and data transfer rates are utilized, however, time intervals must be precisely defined and data sampling must be accurately accomplished. For these reasons, double frequency and phase modulation recording systems introduce midpoint transitions for clocking purposes. The present system is also advantageously operated in this manner, but in accordance with the invention there is also selectively provided a preparatory transition which occurs between the clocking transition and the data time within a data interval. According to this method, a clocking transition is always introduced subsequent to each data time, the value of the next quaternary digit is sensed, and the preparatory transition is employed or not, in dependence upon the needed signal state at the next data time.

Figure 4:
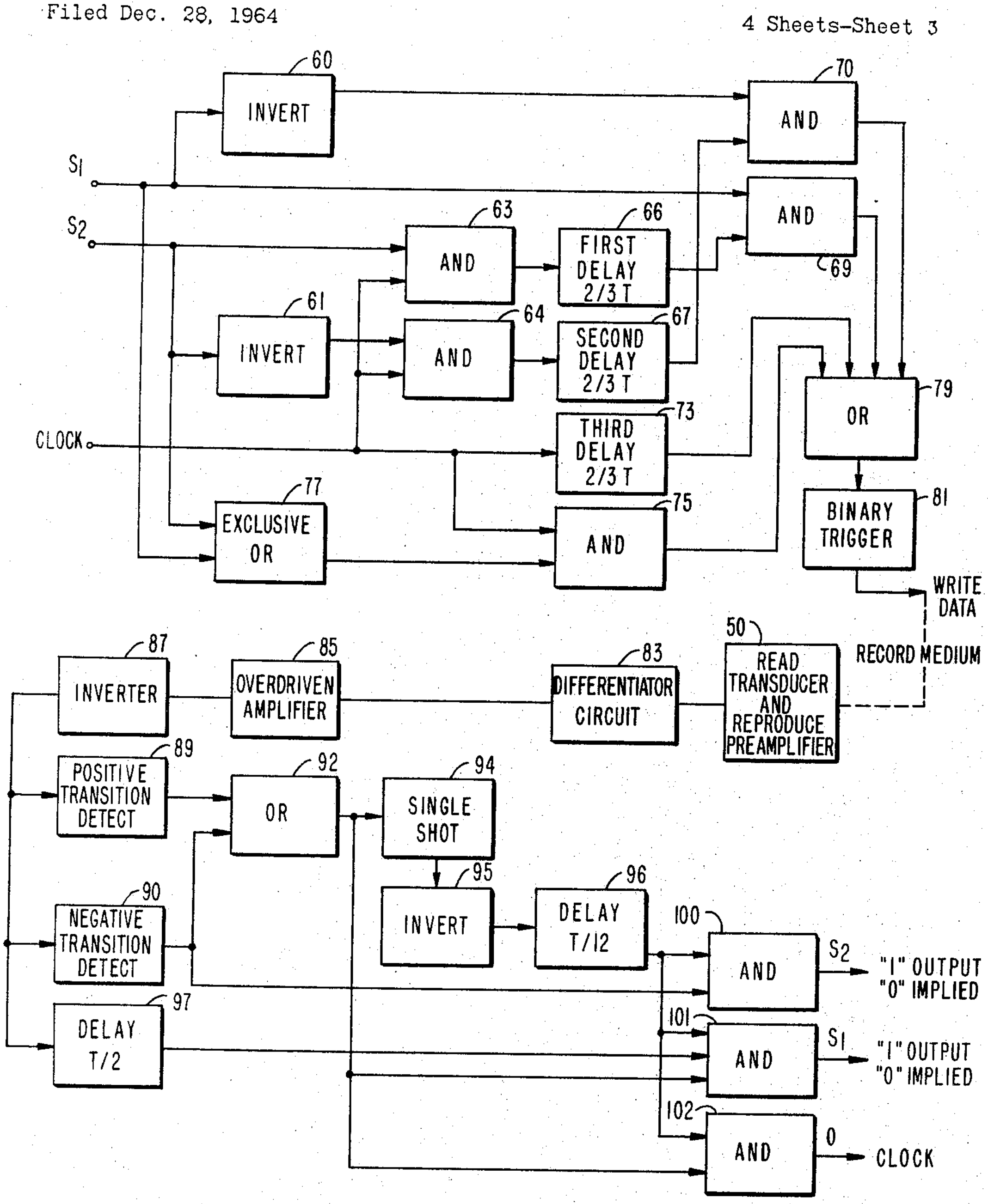
FIG. 4 is a block diagram of a second form of recording and reproducing system in accordance with the invention.
Figure 5:
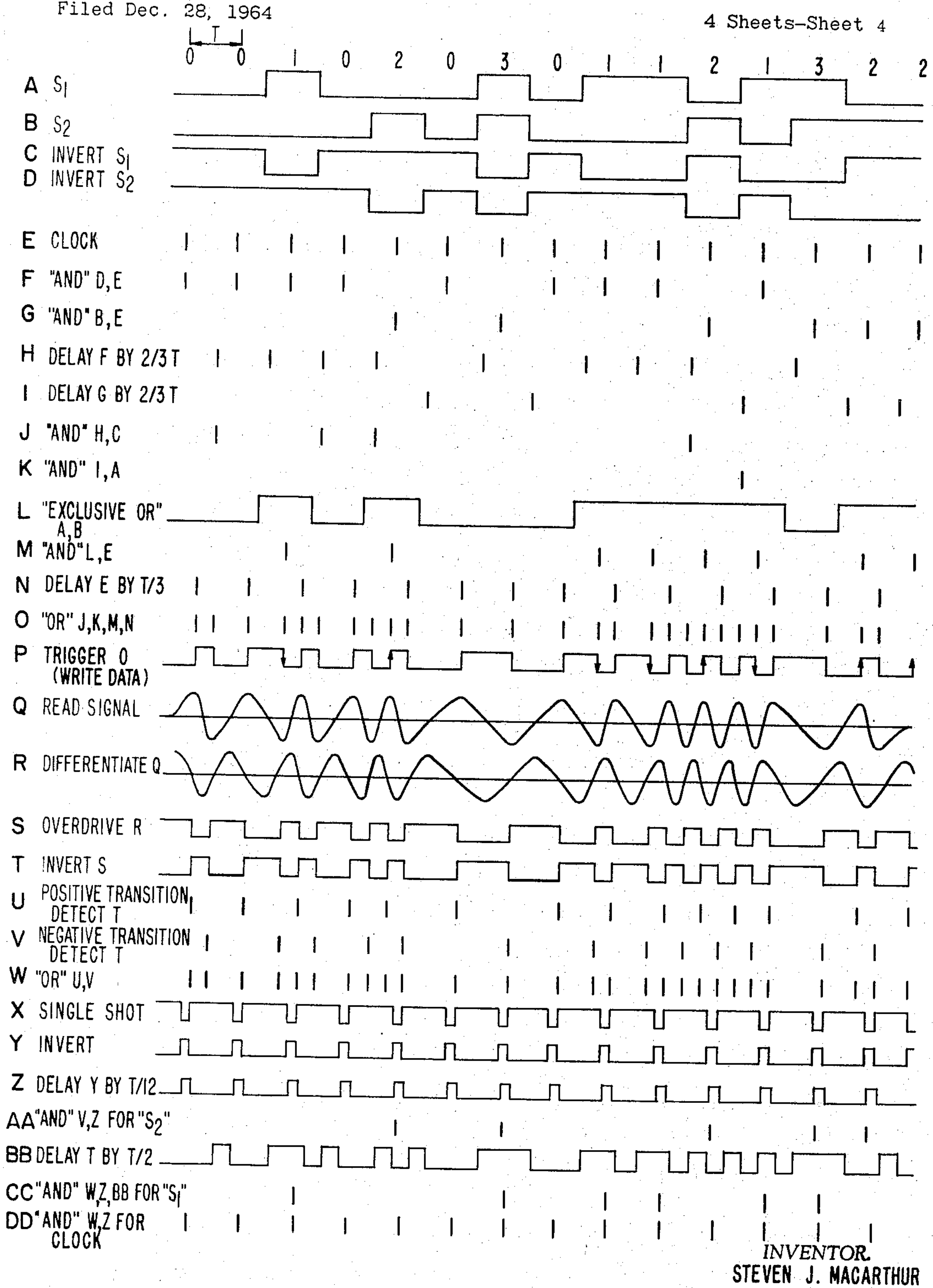
FIG. 5 is a simplified representation of waveforms occurring in the operation of the arrangement of FIG. 4.

An arrangement for this purpose is shown in greater detail in FIG. 4, with waveforms occurring at various points in the system being shown in FIG. 5.

The arrangement of FIG. 4 is described as employed in conjunction with two signal coding, utilizing two binary signal trains $S_1$ and $S_2$ respectively, and provided in the form of different level signals, with the higher level signal designating binary "1." The data interval is again designated as of length T, and a clock pulse is provided at the data times, thus having a frequency $1/T$. It has been found particularly useful and economical to derive the desired quaternary coded signal with an inherent clock transition by combination of gating and delay circuits as shown. It will be recognized, however, that the functions of the delay elements in providing the necessary logic decisions can be obtained through the use of bistable elements and associated gating circuits, in the event that it is desired not to use delay lines.

Recording circuits in the arrangement of FIG. 4 include a pair of inverter circuits 60, 61 each of which receives a different one of the data signals $S_1$ and $S_2$ respectively. The clock signals are applied to a first pair of AND gates 63, 64, one of which receives the $S_2$ signal directly, and the other of which receives the $S_2$ signal after passing through the inverter circuit 61. The output signals from these AND gates 63, 64 are applied through first and second delay circuits 66, 67 which are coupled to input terminals of a succeeding pair of AND gates 69, 70 respectively. The AND gate 70 has its remaining input terminal coupled to the inverter circuit 60, whereas the AND gate 69 is coupled to receive the $S_1$ data signals directly.

Clock signals are applied both to a third delay circuit 73, providing a delay of $T/3$, and to a two input AND gate 75 is also coupled to an exclusive OR circuit 77 which is coupled to receive both of the data signals. The output terminals of the AND gates 69, 70, the third delay circuit 73 and the AND gate 75 are all coupled to separate input terminals of a four input OR gate 79 which is coupled to the trigger input of a binary trigger circuit 81, the output signals from which are applied through the record circuits and the write transducer (not shown) to the record medium for subsequent reproduction.

The system operates in response to the data signals to generate quaternary coded signals, with an included clock transition in every data interval, and with a preparatory transition where necessary, depending upon the subsequent data state. It will be noted that the clock pulse that occurs at the data times (indicated by waveform [E] in FIG. 5) is shifted to the position in the data interval which might be called ⅓ time in the third delay circuit 73. Thus the state of the binary trigger is always changed at this point within the data interval. The binary 0 condition is evidenced by the more negative of the two steady state levels at the binary trigger 81, and is implied by the absence of the other three states. Provision is shown only for changing the state of the binary trigger 81, inasmuch as it is assumed that the trigger circuit 81 is reset, or that the starting state is always properly established.

The quaternary "1" state is that in which the negative-going transition is introduced at the data time, and in which the value of the $S_1$ is a binary 1 and the value of the $S_2$ signal is a binary 0. Under these conditions, the $S_1$ signal activates the exclusive OR gate 77, and the AND gate 75 is concurrently activated, because of the presence of the clock, so that the binary trigger 81 is switched through the OR circuit 79 from its prior state. The quaternary "2" state represents a positive-going transition at the data time, and this is established by the exclusive OR gate 77 and the AND gate 75 in the fashion previously described. The quaternary "3" value is indicated by the maintenance of the output signal at the binary trigger 81 at the more positive steady state level during the data time, and here again reliance is placed upon the proper reversal of the state of the trigger 81 during succeeding data times. Here the time relation of the input signals to the clock and the use of the inverted waveforms (C and D in FIG. 5) together with the ⅔ T delays introduced by the delay circuit 66, 67 become important. As noted in waveforms A and B, the incoming data pulse lasts from midway in one data interval to midway in the next data interval. Thus, for example, when the $S_1$ and $S_2$ digits are both binary "0," the AND gate 70 coupled to the inverter 60 and also the AND gate 64 coupled to the inverter 61 are conditioned by the applied input signals from a time starting midway in the data interval. The output pulse provided from the AND gate 64 is delayed in the second delay 67 to the ⅔ point within the data interval. At this point in time, the binary "0" value in the $S_1$ channel may no longer be present, and if so the AND gate 70 will be blocked. If the $S_1$ value in the subsequent data interval is a binary "0," however, the AND gate 70 will be fully activated and the output signal applied through the OR circuit 79 will switch the state of the binary trigger 81. Consequently, this pulse generated through the delay circuit 67 is used or not, depending upon the state of the next digital value, so that the preparatory transition is properly used in an anticipatory manner.

A different sequence for providing a preparatory transition at ⅔ time may be initiated when the $S_2$ digit is binary "1," through activation of the AND gate 63, and subsequent application of a delayed pulse through the first delay 66 to the AND gate 69. For this AND gate 69 to be fully activated, however, the subsequent $S_1$ digit must be a binary "1," in which event the binary trigger 81 will again be operated at the preparatory transition time. To summarize the use of the preparatory transitions, any $S_2$ digit having a binary "1" value at one data time followed by an $S_1$ digit having a binary "1" value at the next data time will introduce a preparatory transition at the intermediate ⅔ time within the data interval. In similar fashion, an $S_2$ digit of binary "0" followed by an $S_1$ digit of binary "0" will also introduce a preparatory transition.

The functioning of this preparatory transition circuitry is based upon certain relationships between the binary input signals and the quaternary recorded signals. The $S_2$ value of binary "1" is associated with a positive-going transition or the more positive steady state signal level, whereas the $S_1$ binary "1" value is associated either with a negative-going transition or the more positive steady state level. Thus if the immediately previous data time involved a binary "1" $S_2$ digit, the binary trigger 81 was set to the more positive state, and would be returned to the more negative state by the clock transition at ⅓ time. If the subsequent $S_1$ digit were of binary "1" value, it would then be necessary to return to the more positive level by the introduction of a preparatory transition at the ⅔ point. The positive level is necessary to provide a negative-going transition at the data time for a quaternary "1" digit, or to maintain the positive level for a quaternary "3" digit. An $S_2$ value of binary "0" in one data interval means the trigger is negative after the data time, and then positive after the clock transition. Therefore, if the $S_1$ value in the subsequent data interval is a binary "0," the preparatory transition must be inserted, because of the subsequent quaternary state possibilities.

The waveforms of FIG. 5 illustrate the fact that the clock pulses (waveform E) are effectively combined with the data pulses (waveforms A and B), and with the output signal from the exclusive OR circuit 77 (waveform L) to provide the data transitions in accordance with the quaternary code, as previously described in conjunction with FIG. 2. The clock transitions, derived from the clock pulses (waveform E) are introduced at every ⅓ time, but the preparatory transitions are introduced, as above described, only under particular conditions.

The circuit for reproducing the data includes a read transducer and reproduce preamplifier circuits 50 of conventional form, coupled to feed a differentiator circuit 83 that in turn supplied signals to an overdriven amplifier 85. As shown in waveform Q in FIG. 5, the reproduced signal is very much rounded in form, due to recording at a density approaching that of the ultimate capability of the transducer. After differentiation in the circuit 83, a waveform is provided in which the peaks in the reproduced signal correspond to zero crossings in the differeniated wave (waveform R in FIG. 5). The differentiated signal, when fed to an overdriven amplifier 85, such as a high gain, current saturating amplifier, produces a square wave transitions occurring at the zero crossings, and constituting a mirror image of the recorded signal, as may be seen by comparison of waveform P with waveform S in FIG. 5. Thus the signal from the overdriven amplifier 85 is passed through an inverter 87, to regenerate the recorded signal, as shown by waveform T in FIG. 5.

A pair of transition detector circuits 89, 90 for positive and negative transitions, respectively, is coupled to receive the signal from the inverter circuit 87, and to provide a sequence of output pulses denoting the individual transitions in time. These two pulse series are then combined in an OR circuit 92, the output signal from which drives a self clocking arrangement which is used in conjunction with the gating network for regenerating the binary values of the two signal trains.

In the clocking circuit, the output signal from the OR circuit operates a single-shot multivibrator 94 having an active interval of ⅚ T which in turn feeds an inverter circuit 95. The single-shot multivibrator 94 is thus triggered by a clock pulse, remains active for a ⅚ T interval, and then resets, to be activated once again by the next clock pulse. This arrangement will ultimately achieve self-synchronization to the clock transitions, inasmuch as these are present in every data interval and the quaternaly coded data will follow irregular patterns. Once locked on to the clock times, the single-shot thereafter is operated solely by the clock transitions. It is more convenient, however, to provide, in conventional fashion, a succession of clock pulses at the start of a data sequence. The clock waveform (waveform X) and the clock waveform (waveform Y) are shown in FIG. 5, with the signal representative of waveform Y being fed to a delay circuit 96 which introduces a delay of T/12, as indicated by waveform Z.

The reproduced data signal derived from the inverter circuit 87 is provided to a delay circuit 97 which provides a delay of T/2, seen in wavefrom BB in FIG. 5.

The signals from the delay circuit 97, the OR circuit 92, the negative transition detect circuit and the delay circuit 96 are provided to a group of three AND gates 100, 101 and 102. Note that the delayed widened clock pulse from the delay circuit 96 encompasses the data times, so that it is used to condition each of the AND gates 100, 101, and 102. The output signal from the OR circuit 92, when combined with this conditioning signal in the AND gate 102, reconstitutes the clock signal. At the output terminals, however, the data time intervals are now taken with respect to this reconstituted clock signal, and not with respect to the data time points in the signal as it was reproduced.

The binary "0" values for the signal trains $S_1$ and $S_2$ are indicated by the nonactivation of the AND gates 100, 101. The $S_2$ value is a binary "1" whenever the data signal is at its positive level or in a positive-going transition at the data time. Reliance here is placed on the fact that at the next clock transition, ⅓ data interval later, a negative-going transition thus invariably indicates the presence of the binary "1" in the $S_2$ channel. This condition is detected simply by identifying coincidence of the widened delay clock pulse from the delay circuit 96, with the negative transition pulse from the negative transition detector circuit 90.

A binary "1" value in the $S_1$ channel is identified at the undelayed clock time in the form of either a negative-going transition or a positive level at the data time. For this purpose, the clock pulse, the delayed widened clock pulse, and the delayed reproduced signal from the delay circuit 97 are combined in the AND gate 101. Thus, at the clock time the delayed reproduced waveform is at its most positive level for both these conditions, and the binary "1" is correctly indicated for the $S_1$ channel.

It will be appreciated that this system for concurrently recording and reproducing two signal trains is amenable to modification of the combined signals so as to retain one of the signal trains while completely revising the other. In a random access memory, for example, data recorded on a signal track location may be reproduced, revised and recorded in a single pass if separate read and write transducers are employed, and the data processing system is capable of making the necessary combination of one of the reproduced signal trains with the new data.

It will also be observed that a substantial increase in storage capacity is achieved without requiring any change of the data transducer or the record medium characteristics. As in double frequency and phase modulation recording, signal recording systems in accordance with the invention record at a transition frequency which is a multiple (here three) of the data interval rate, but the present system represents two values per information bit, whereas other systems provide only one signal per information bit. Double frequency and phase modulation recording have an information bit frequency equal to that of NRZI recording, and the present system has an information bit frequency equal to ⅔ that of NRZI recording. The present system, however, also doubles the number of signals per information bit, so that it has 4/3 times the storage capacity of the same recording system, without any change of the parameters of the transducers of record media.

It will be realized that quaternary coding permits a substantial revision of data coding schemes whether used in parallel or serial form. If used in parallel form, only three data tracks are required for alphanumeric information. When used in serial form, individual characters can be encoded in three successive places to provide a total of 64 possible characters. The result is a substantially higher density and data rate at the expense of a relatively small amount of additional gating circuitry to effect the conversion from binary to quaternary and back again.

Note that the preparatory transition can precede as well as follow the clock transition within the data interval. Appropriate modification of the record and reproduce logic to accommodate this alternate sequence will be evident to those skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of magnetically recording quaternary digital data and single record track of a magnetic medium comprising the steps of maintaining one of two steady magnetization states in the magnetic medium to represent a pair of two bit binary values, and introducing transitions between the magnetization states at selected times to represent a second pair of two bit binary values.

2. The method of providing a binary valued signal train representing quaternary digital data which comprises the steps of maintaining different steady state levels to represent either selected one of a first pair of digital values, and introducing transitions between one steady state level and the other to represent either of a second pair of digital values, in accordance with the direction of the transition.

3. The method of recording digital data at a selected data rate on a single record track of a magnetic medium comprising the steps of establishing a succession of regularly spaced data points, establishing a succession of regularly spaced clock points, each clock point having a fixed time of occurrence within the interval defined by a pair of successive data points, maintaining one of two magnetic saturation states in the magnetic medium at the data points to represent a first pair of binary values, alternatively establishing one of two transitions between saturation states of the data points to represent a second pair of binary values, thus to provide four possible digital values, and establishing transitions at the clock points in accordance with the relationship between the magnetization conditions at successive data points.

4. The method of recording digital data at a selected data rate on a single record track of a magnetic medium comprising the steps of establishing a succession of data points that are regularly spaced in time, establishing a succession of regularly spaced transition points, each transition point having a fixed time of occurrence within the data interval defined by a pair of successive data points, establishing a magnetization condition at the data points representing either (1) steady state magnetization of either polarity or (2) a sharp transition of either polarity direction between the steady state conditions, thus to provide a quaternary code, and selectively introducing transitions at the transition points in accordance with the succeeding magnetization condition at the next data point.

5. The method of recording quaternary digital data at a selected rate on a single record track of a magnetic medium comprising the steps of defining a succession of regularly spaced data points, each pair of successive data points defining a data interval, defining a succession of regularly spaced clock points occurring at fixed points within the data interval, establishing a succession of regularly spaced transition points, each occurring at a fixed time between the clock point and the succeeding data point within a data interval, introducing a transition from the previous magnetization state to the opposite magnetization state at each clock point, establishing either (1) a steady magnetization state of a selected polarity or (2) a sharp transition of a selected polarity direction at a data point, and selectively introducing transitions at the transition points in accordance with the relation between the magnetization conditions between successive data points.

6. The invention as set forth in claim 5 above, wherein the clock is introduced at ⅓ time in the data interval, and the preparatory transition is introduced at ⅔ time in the data interval.

7. The method of providing quaternary-coded data in a single train in the form of a time-varying signal which includes the steps of establishing a succession of data points that are regularly spaced in time, establishing a succession of regularly spaced transition points, each transition point having a fixed time of occurrence within the data interval defined by a pair of successive data points, providing a signal having either of two different steady state levels, establishing at each data time either (1) a given one of the steady state levels or (2) a sharp signal transition of a given direction between the two levels, and introducing a preparatory transition at the transition point in accordance with the signal condition to be established at the next data piint.

8. A method of recording digital data on a single record track of a magnetic medium comprising the steps of establishing successive time increments for digital values, said time increments including a data time, recording unique signal conditions at the data times, there being at least four possible signal conditions, and inserting preparatory signal conditions within the time increments and between the data times in accordance with a succeeding required signal condition.

9. A method of recording and reproducing digital data on a single record track of a magnetic medium comprising the steps of establishing successive time increments for digital values, said time increments including a data time, recording unique signal conditions at the data times, there being at least four possible signal conditions, recording inserted preparatory signal conditions at selected times within the time increments and between the data times in accordance with a succeeding required signal condition, reproducing the recorded signal, and identifying the unique signal conditions as digital values.

10. The invention as set forth in claim 9 above, wherein the data time and the times of the preparatory signals are both synchronous with a clock frequency.

11. A method of concurrently recording a pair of binary digital signal trains on a single record track of a magnetic medium, including the steps of recording one of four unique signal conditions at regularly spaced data points in successive data cells, the four signal conditions comprising saturation recording in either polarity sense or a transition in either polarity direction, recording intermediate clock transitions at a predetermined point within each data cell, and recording preparatory signal transitions between the clock transition in a data cell and the data point in a succeeding cell, the preparatory transition being dependent upon the relation of the signal state at the clock transition to the desired signal condition at the next data point.

12. A method of concurrently recording and reproducing a pair of binary digital signal trains on a single record track of a magnetic medium including the steps of recording one of four unique signal conditions at regularly spaced data points in successive data cells, the four signal conditions consisting of saturation recording in either polarity sense or a transition in either polarity direction, recording intermediate clock transitions at a predetermined point within each data cell, recording a preparatory signal transition between the clock transition in the data cell and the data point in the succeeding cell, the preparatory transition being dependent on the relation of the signal state at the clock transition to the desired signal condition at the next data point, reproducing the record signal, identifying the clock transitions, identifying the signal conditions at the data points, and establishing the binary digital values for each of the signal trains from the signal conditions.

13. The invention as set forth in claim 12 above, wherein the clock transitions occur at ⅓ time within the data cell and the preparatory signal transitions occur at ⅔ time within the data cell, and wherein the recorded data points, clock transitions and preparatory signal transitions are denoted in time by a clock pulse train having a frequency three times that of the data cell.

14. A digital data recording system including the combination of clock means for establishing successive data intervals, the data intervals each including data times, signal generating means responsive to control signals for providing one of four selected signal conditions, such signal conditions being steady state conditions of opposite polarity and opposite-going transitions therebetween, transducer means responsive to the signal generating means for recording the generated signals on a single record track of a magnetic medium and control means responsive to input data and the clock means for generating time varying control signals having (1) steady state or (2) transitional conditions at the data times, said control means also including means responsive to the desired condition at the next data time for varying the control signal to introduce selective preparatory transitions between the data times.

15. The invention as set forth in claim 14 above, whereing the control means respond to the input data and the clock means to establish clock variations occurring at a predetermined time within each data interval, a data representative condition at each data time, and a preparatory variation intermediate clock and data times and dependent upon the relationship of the successive signal conditions thereat.

16. A system for reproducing quaternary coded digital data recorded as transitions or as saturation magnetization conditions of either polarity on a single record track of a magnetic medium, the recorded data including clock transitions and the system comprising reproducing means for generating signals representative of the recorded data, means responsive to the generated signal for identifying the clock transitions, means responsive to the identified clock transitions for sampling data states in the generated signal, and logic means responsive to the data states for identifying the quaternary values in the sampled data.

17. A system for generating a signal waveform representing quaternary coded values comprising means providing a clock signal having a frequency which is a multiple of the desired data rate, signal generating means responsive to selected regularly spaced clock signals and to input data for establishing a signal waveform having either of two steady state levels, or either of two sharply defined opposite-going transitions between the steady state levels at the times of the selected clock signals, thus providing four available data conditions in the signal waveform, and means responsive to the relationship between successive data conditions for selectively introducing intermediate transitions therebetween.

18. A system for concurrently recording a pair of binary-valued signal trains in a single channel comprising means responsive to each of the signal trains for generating a signal train having either of two steady state levels, with transitions selectively introduced at selected regularly spaced times, such that either the steady state levels or the transitions represent data, and means responsive to the relationship between successive data values as represented by the signal conditions at successive regularly spaced times, and including means for storing the last previous transition, for selectively introducing transitions intermediate the regularly spaced times.

19. A system for reproducing quaternary coded digital data recorded at successive data times on a single record track of a magnetic medium, the data including intermediate clock transitions between the data times and the system comprising reproducing means for generating signals representative of the recorded data, means responsive to the generated signal for identifying the clock signal, means responsive to the identified clock signal for sampling data states in the generated signal, and logic means responsive to the identified clock signal and to the data states for separately identifying the quaternary conditions.

20. A system for reproducing quaternary coded digital data recorded on a single record track of a magnetic medium, with different digital values being represented by opposite states of saturation magnetization and oppositely directed transitions between saturation magnetization conditions, comprising: transducer means for reproducing signals representative of the data, means responsive to the reproduced signals for separately identifying positive-going and negative-going transitions in the recorded data, resettable clock pulse generator means providing a variable frequency clock signal at an integral multiple of the nominal data rate, the clock pulse generator means being responsive to and reset by the means for identifying transitions, and logical gating means including bistable means responsive to the identified transitions and the clock signal for separately indicating each of the quaternary digital values.

21. The invention as set forth in claim 20 above, wherein the transitions occur at data times and preparatory times, the preparatory times being intermediate the data times, and both the data times and preparatory times having a regular periodicity defining a clock frequency, wherein the logical gating means include at least a pair of bistable devices, one controlled by the identified transitions and the other by the clock signal, and a plurality of coincidence gates coupled to be controlled by the identified transitions and the bistable devices, for separately identifying the quaternary values.

22. A system for reproducing two binary signal trains recorded as quaternary coded digital data on a single record track of a magnetic medium, with the different digital values being represented by opposite states of saturation magnetization or oppositely directed transitions between saturation magnetization conditions, comprising: transducer means for reproducing signals representative of the data, means responsive to the reproduced signals for separately identifying positive-going and negative-going transitions in the recorded data, resettable clock pulse generator means providing a variable frequency clock signal at an integral multiple of the nominal data rate, the clock pulse generator means being responsive to and reset by the means for identifying transitions and logical gating means including bistable means responsive to the identified transitions and the clock signal and including means for introducing delays relative to the clock signal, for separately indicating the binary values of the two signal trains for each data point in the recorded data.

23. A system for recording and reproducing a pair of concurrent signal trains representing binary digital values and comprising first data source means providing a first binary-valued signal train at a selected data rate, second data source means providing a second binary-valued signal train at the same data rate, both signal trains designating individual binary states by selected signal levels and having sharp transitions occurring at points in time having a selected periodicity, a source of square wave signals having a periodicity half that of the selected periodicity and synchronous therewith, inverter means coupled to receive the two square wave signals, gating means coupled to the first and second data source means and to the source of square wave signals and the inverter means for providing a combined rectangular wave signal having transitions coincident with transitions in the square wave, a record medium, means responsive to the rectangular wave signals for recording magnetization patterns corresponding thereto in a single channel of the record medium, means responsive to the magnetization patterns for reproducing signals representative thereof, means responsive to the reproduced signals for generating first and second pulse sequences separately representing the opposite-going transitions in the recorded signal, variable frequency clock means having a frequency twice the data rate, the clock means being responsive to the first and second pulse sequences and including means for resetting in response thereto, first bistable means responsive to the first and second pulse sequences for providing a first control signal and indicative of the presence of a selected steady state condition in the data signal, second bistable means responsive to the clock pulses and providing a second control signal indicative of sampling times, a pair of coincidence detecting means, each responsive to a different one of the first and second pulse sequences and to the second control signal for separately indicating the occurrence of two selected digital values, a third coincidence detecting means responsive to the first and second control signals and the clock pulses for indicating the occurrence of a third selected digital value, and means including a pair of gating means coupled to the pair of coincidence detecting means and the third coincidence detecting means, for separately indicating the binary digital values of the two concurrent signals.

24. A system for recording and reproducing a pair of concurrent signal trains on a magnetic medium with high density and high data rates, the concurrent signal trains each representing a sequence of binary digital values, and the system comprising first data source means providing a first binary-valued signal train at a selected data rate, second data source means providing a second binary-valued signal train at the same data rate, both signal trains designating individual binary states by selected signal levels and having sharp transitions occurring at points in time having a selected periodicity, means providing clock signals having a frequency equal to that of the selected data rate, the clock pulses occurring at the transition times in the data signals, binary trigger means providing output signals of two different steady state levels, and switching between the levels in response to trigger input signals, exclusive "OR" means coupled to receive both signal trains for indicating the occurrence of a first quaternary value, gating means coupled to the exclusive "OR" means and to receive the clock pulses, and coupled to operate the binary trigger, delay means providing a ⅓ data interval delay time, and coupled to apply the clock pulses after the ⅓ delay to operate the binary trigger, preparatory transition means coupled to receive the clock pulses and the signal train and coupled to operate the binary trigger, the preparatory transition means including inverter means and means for introducing a delay ⅔ that of the data interval, and including means for comparing the data state in one data interval to the required data state in the succeeding data interval, the preparatory transition means operating the binary trigger at the ⅔ time in the data interval selectively in response to the relationship of the succeeding digital values, means for recording the signal variations of the binary trigger means on the recording medium, means for reproducing the recorded signal, differentiating circuit means coupled to the means for reproducing, overdriven amplifier means coupled to receive the differentiated signal, to provide a rectangular wave having transitions corresponding to those of the recorded signal, inverter means coupled to the overdriven amplifier means for providing a rectangular wave corresponding to the recorded signal, a pair of transition detector means both coupled to the inverter means, a first transition detector means being responsive to positive transitions and the second being responsive to negative transitions, both transition detector means providing output pulses indicative of the transitions, means responsive to the positive and negative transition detection pulses for providing a relatively wide clock pulse, said means including a single shot multivibrator having an active interval which is a substantial portion of a data interval, means for inverting the signal from the single shot multivibrator, and delay means for shifting the inverted pulse representative of the inactive portion of the single shot multivibrator into a symmetrical time relation relative to the transitions in the reproduced signal, a plurality of AND gates, each responsive to the relatively wide clock pulses, a first AND gate being responsive to the negative transition detection pulse for indicating the value of a first of the binary signal trains, a second AND gate being responsive to the positive and negative transition pulses and to the relatively wide clock pulse for providing a brief clock pulse, means coupled to the inverter means for providing a delay of half the data interval, and the third AND gate being responsive to the positive and negative transition detection pulses, the relatively wide clock pulses, and the said delay means, for indicating the binary value of the other of the signal trains.

References Cited

UNITED STATES PATENTS

| | | | |
|---|---|---|---|
| 2,807,004 | 9/1957 | Pouliart et al. | 340—174.1 |
| 3,274,611 | 9/1966 | Brown et al. | 340—174.1 |
| 3,281,806 | 10/1966 | Lawrance et al. | 340—174.1 |

BERNARD KONICK, *Primary Examiner.*

A. I. NEUSTADT, *Assistant Examiner.*

UNITED STATES PATENT OFFICE

CERTIFICATE OF CORRECTION

Patent No. 3,357,003 December 5, 1967

Steven J. MacArthur

It is hereby certified that error appears in the above numbered patent requiring correction and that the said Letters Patent should read as corrected below.

Column 3, line 19, for "self-locking" read -- self-clocking --; column 4, line 46, for "data" read -- data rate --; column 5, line 55, for "pulse" read -- pulses --; column 6, line 8, for "interval" read -- intervals --; line 21, for "cooling" read -- coding --; line 49, for "differential" read -- differentiated --; column 10, line 64, for "supplied" read -- supplies --; line 74, after "wave" insert -- having --; column 11, line 23, for "quaternaly" read -- quaternary --; line 59, for "pulse" read -- pulses --; column 13, line 35, after "clock" insert -- point --; line 51, for "piint" read -- point --.

Signed and sealed this 1st day of July 1969.

(SEAL)
Attest:

EDWARD M.FLETCHER,JR.
Attesting Officer

WILLIAM E. SCHUYLER, JR.
Commissioner of Patents